United States Patent [19]

Willis

[11] Patent Number: 5,272,831
[45] Date of Patent: Dec. 28, 1993

[54] INSECT EXTERMINATION AND ILLUMINATION DEVICE AND OPERATING CIRCUIT THEREFOR

[75] Inventor: Candler A. Willis, Zirconia, N.C.

[73] Assignee: Regent Lighting Corporation, Burlington, N.C.

[21] Appl. No.: 939,926

[22] Filed: Sep. 2, 1992

[51] Int. Cl.⁵ .............................................. A01M 1/22
[52] U.S. Cl. ...................................... 43/112; 43/113; 336/165
[58] Field of Search ............... 315/209 R, 178, 210, 315/212; 43/112, 113, 98, 99; 336/165, 160, 155

[56] References Cited

U.S. PATENT DOCUMENTS

| | | | |
|---|---|---|---|
| 1,962,420 | 6/1934 | Bradley | 43/112 |
| 2,436,925 | 3/1948 | Haus | 336/165 |
| 2,558,293 | 6/1951 | Feinberg | 315/100 |
| 3,022,458 | 2/1962 | Sola | 336/165 |
| 3,373,314 | 3/1968 | Nilssen | 315/212 |
| 3,919,595 | 11/1975 | Willis | 336/165 |
| 4,248,005 | 2/1981 | Hedstrom | 43/112 |
| 4,387,529 | 6/1983 | Hedstrom | 43/112 |
| 4,422,015 | 12/1983 | Nilssen | 315/209 R |
| 4,807,390 | 2/1989 | Stevens | 43/113 |
| 4,943,763 | 7/1990 | Bobry | 323/309 |

FOREIGN PATENT DOCUMENTS 0958686  3/1950  France ................. 336/165

Primary Examiner—Paula A. Bradley
Assistant Examiner—James Miner
Attorney, Agent, or Firm—Olive & Olive

[57] ABSTRACT

An electrical circuit is provided for operating a combination insect electrocution grid and outdoor lamp. The circuit of the invention utilizes a high leakage reactance transformer in which a primary coil and two secondary coils are wound on a common core, the primary coil is centrally situated and the two secondaries are situated on opposite ends of the primary. A magnetic shunt is provided in the transformer between the primary and the high voltage secondary coil. A peaking capacitor, selected to induce the power frequency to resonate at the third harmonic, is connected to the high voltage secondary coil to generate the high voltage which energizes the electrocution grid. The other secondary coil is a ballast secondary which energizes the illumination means.

15 Claims, 2 Drawing Sheets

INSECT EXTERMINATION AND ILLUMINATION DEVICE AND OPERATING CIRCUIT THEREFOR

BACKGROUND OF THE INVENTION

1. Field of the Invention

This invention relates to a combination insect extermination and illumination device and, particularly, to an electric circuit capable of concurrently operating both a device for killing insects by electrocution and a lamp providing both an insect luring light and continuous illumination of an area around the device.

2. Description of Related Art

Electrical devices for killing insects by electrocution have been known and sold commercially. These devices incorporate a high voltage electrocution grid and a low power light source means for attracting the insects both of which are mounted in a suitable housing. The typical insect exterminator light source is of a form primarily designed to attract insects and while some illumination is produced, such illumination is at a relatively low level. Existing electric insect exterminators generally utilize lighting means in the form of relatively low power fluorescent tubes and a ballast transformer which controls the current flowing through the fluorescent tubes. For example, the apparatus for electrically exterminating insects of De Yoreo (U.S. Pat. No. 4,182,069), the electric insect trap of Hamid et al. (U.S. Pat. No. 3,935,662) and the electric insect killer of Hedstrom (U.S. Pat. No. 4,248,005) utilize such an arrangement. Other devices, for example the insect exterminator of Rittenhouse (U.S. Pat. No. 1,982,123), have been designed to incorporate a simple incandescent filament lamp fixture which is powered independently of the electrocution device circuitry. Such illumination arrangements are sufficient for attracting insects; however, these prior art arrangements do not provide relatively high level illumination and therefore one or more additional lighting fixtures such as a mercury vapor lamp need to be used concurrently with the exterminating device when a relatively high level of illumination is needed at the site of the device, whether in an indoor or outdoor environment.

The insect exterminator of Folmer et al. (U.S. Pat. No. 1,962,439) teaches the use of a mercury vapor lamp. The use of such a lamp is attractive as a mercury vapor bulb provides the benefit of an ultraviolet light which has been known to attract insects. In addition, the mercury vapor bulb has a long service life and produces a high level of light output. Additional useful background information on the relation of light wave length to attracting insects can be found in U.S. Pat. Nos. 3,540,145 and 4,157,629.

Unlike a fluorescent lamp, it is a characteristic of a mercury vapor lamp that, after the bulb is energized, several minutes must elapse before normal operation is reached. This peculiar characteristic of the mercury vapor lamp, even though more desirable from the viewpoint of attracting insects and providing substantial and efficient illumination, presents difficulties in incorporating such a lamp with a transformer operated electric insect exterminator. In such a device, an electrocution of an insect normally causes a disturbance in the magnetic flux which propagates in the circuit. In the absence of means for offsetting the effect of such disturbance, such disturbance will cause an interruption in the light output of the mercury vapor lamp each time an insect is electrocuted. In order to avoid this problem, Folmer's insect exterminator circuit incorporates two independent transformers so as to operate the lamp and the electrocution grid separately. Although Folmer's invention is capable of providing a constant light output, such a device which utilizes two separate transformers as a practical device is heavy, cumbersome and expensive. It would therefore be preferred to have a device which utilizes a single transformer to concurrently and continuously operate both an electrocution grid and a lamp and to have the lamp serve as both an insect luring light and a source of continuous illumination for the area where the device is located.

Single transformers which are capable of operating two separate loads are generally known though not in the form of the present invention. For example, the electric insect killer of Hedstrom (U.S. Pat. No. 4,248,005) teaches a circuit which utilizes a single transformer to operate both the electrocution grid and a pair of insect-attractive fluorescent lamps. The described circuit however permits the collapse of the magnetic field following an electrocution. Furthermore, if such a circuit were to be integrated in a circuit to concurrently operate both an electrocution grid and a mercury vapor lamp, this would inevitably lead to several minutes of interruption in the light output whenever an electrocution occurred during which interruption, the mercury vapor in the lamp would condense. Useful related transformer background information is also to be found in U.S. Pat. Nos. 3,061,759 and 3,919,595.

A single-primary, dual-secondary coil transformer having all of the electrical coils wound on a common core is disclosed in U.S. Pat. No. 2,558,293 to Feinberg as a part of an apparatus for starting and operating gaseous discharge devices. However, in the Feinberg-type circuit, an intimate interconnection of the coils and loads does not allow for the operation of two independent non-interacting devices, such as an electrocution grid and a lamp. A somewhat similarly structured transformer is taught in U.S. Pat. No. 4,943,763 to Bobry. Although the transformer shown in the Bobry patent provides for the operation of two independent, non-interacting devices, its ferroresonant manner of operation is unsuitable for the operation of a device of the character herein described.

Reference is also made for background purposes to U.S. Pat. No. 4,422,015 to Nilsen in which a single transformer is illustrated as driving both a fluorescent lamp for attracting insects and an insect destruction grid. However, in the '015 patent, the secondary coils driving the lamp and electrocution grid, unlike the present invention, are not mounted on the same transformer leg as the leg on which the primary coil is mounted. The '015 patent transformer thus causes the primary coil flux to split into two substantially equal components one linking the lamp secondary drive coil and the other linking the electrocution grid drive coil. The present invention recognizes two undesirable consequences of the '015 patent transformer-winding arrangement. First, the reduction in flux in each secondary coil requires a proportionate increase in number of turns required, leading to increases in both cost and losses. Second, a disturbance in the high voltage circuit tends to disturb the lamp circuit thus defeating isolation as obtained by the present invention.

SUMMARY OF THE INVENTION

The circuitry of the present invention permits Operation of a combination insect exterminator and illumination lamp in an independent and non-interacting manner.- Electrocution of an insect with the device of the invention causes some but a visibly undetectable change in the light output of the illumination device.

The circuit in the invention device utilizes a high leakage reactance transformer having a single core on which the primary coil and two secondary coils are wound. In the preferred embodiment, the primary coil of the transformer is centrally located on one leg of the transformer and the two secondary coils are located on opposite sides of the primary coil and on the same leg. A first magnetic-flux shunt, illustrated as a narrow air gap, is incorporated in the transformer construction and is situated between the primary coil and the first secondary coil. The first secondary coil is a high voltage secondary coil and is utilized to energize an electrocution grid. A second magnetic-flux shunt, illustrated as being formed of the core laminate material, is incorporated in the transformer construction between the primary coil and the second secondary coil. The second secondary coil in conjunction with the transformer acts as a lamp ballast and energizes an illuminating fixture, which, in a preferred embodiment, is a mercury vapor lamp that serves as both an insect luring light and a source of illumination for the area, whether indoor or outdoor, where the invention device is located. The invention circuit also, in the preferred embodiment, includes a capacitor in parallel with the high voltage secondary coil and whose value is selected so as to resonate the third harmonic of the power frequency, typically 60 cycles, thereby producing a highly peaked output voltage. By increasing the output high voltage, less turns are required on the high voltage secondary coil. Additionally, in the preferred embodiment, the primary coil and the secondary coil which operates the lamp are connected in series so as to add the respective voltages thereby reducing the number of turns needed in the secondary coil which operates the lamp. The circuit design of the invention thus minimizes the number of windings required to generate the power necessary for concurrently energizing the electrocution grid and the illumination fixture thereby reducing the cost of production and the weight of the device. The components of the invention circuit and the illumination fixture, in the preferred embodiment, are both mounted on a common housing.

During operation, a substantially constant sinusoidal flux flows under the primary coil of the transformer. At either end of the transformer, the flux return path partially links the associated secondary coil and partially goes through the respective associated magnetic-flux path. When an insect is electrocuted causing firing of the high voltage circuit, the high voltage secondary coil presents itself to the core as a shorted turn. To offset this effect on the lamp, the magnetic-flux shunt between the primary coil and the high voltage secondary coil is, in the preferred embodiment, made sufficient in cross section to permit the full primary coil flux to pass without reflecting a magnetic disturbance into the lamp side of the circuit. This permits the lamp to provide a substantially constant light level for purposes of illumination.

An object of the invention is thus to provide an improved insect exterminating device which incorporates an electrical circuit suitable for continuously operating both an insect exterminator as well as a lamp which functions as a source of illumination for either an indoor or outdoor environment and also as an insect luring light source.

A still further and more specific object of the invention is the provision of such an electrical circuit for operating a combination insect extermination and illumination device in which electrocution of an insect by means of an electric arc causes a visibly undetectable disturbance in the light output.

Among still other objects of the invention is the provision of an electrical circuit for operating a combination insect extermination and illumination device of the character herein described which is conducive to economical mass production, simple assembly, and facile repair, which is simple and effective in design, which kills insects by means of electrocution and which provides sufficient illumination for outdoor or indoor lighting.

Other objects and advantages will be more fully apparent from the following disclosure and appended claims.

DETAILED DESCRIPTION OF THE INVENTION

Figure 1:
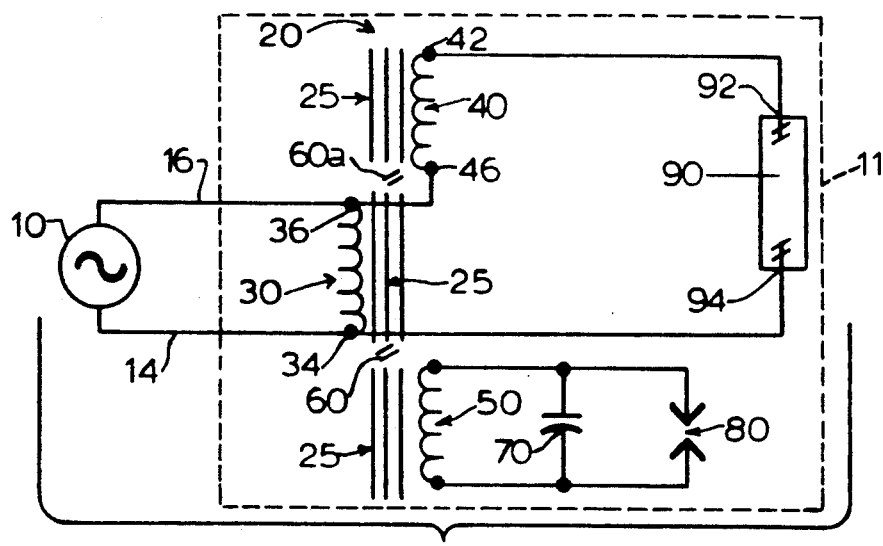
FIG. 1 is a schematic diagram of a first form of the invention device showing a representative housing in dashed lines and showing a first form of the circuit of the invention adapted for simultaneously and continuously operating both a schematically illustrated insect electrocution grid and a schematically illustrated illumination device assumed to be an outdoor type mercury vapor lamp.

Referring to FIG. 1, housing 11, shown in dashed lines, represents any representative type of housing suited to the requirements of the invention as will be readily understood in reference to the cited prior art patents related to extermination devices and the general art related to supporting and housing outdoor illumination devices such as outdoor mercury vapor lamps.

Figure 3:
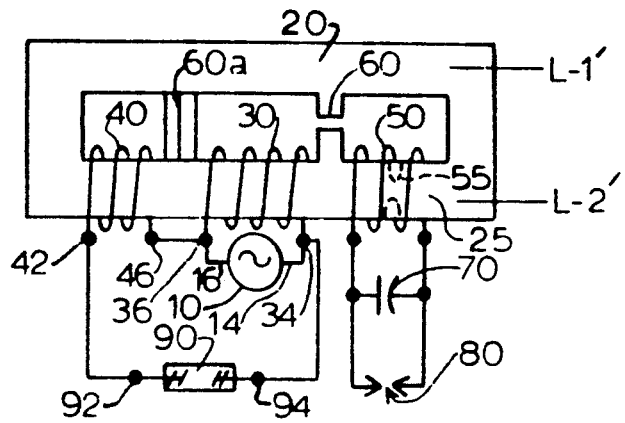
FIG. 3 is a diagrammatic view showing a second embodiment of a transformer-winding configuration for energizing both the electrocution grid and the mercury vapor lamp in a non-interacting manner, the transformer portion of which can be used with either the first form (FIG. 1) or second form (FIG. 4) of the invention device.
Figure 4:
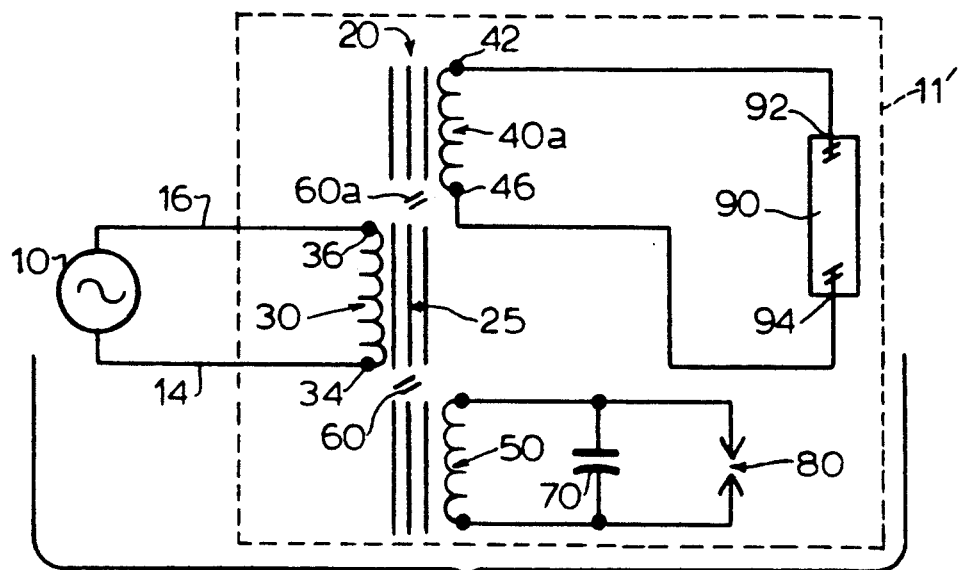
FIG. 4 is a schematic diagram of a second form of the invention device showing a representative housing in dashed lines and showing a second form of the circuit of the invention adapted for operating both a schematically illustrated insect extermination grid and a schematically illustrated illumination device assumed to be an outdoor type mercury vapor lamp.
Figure 5:
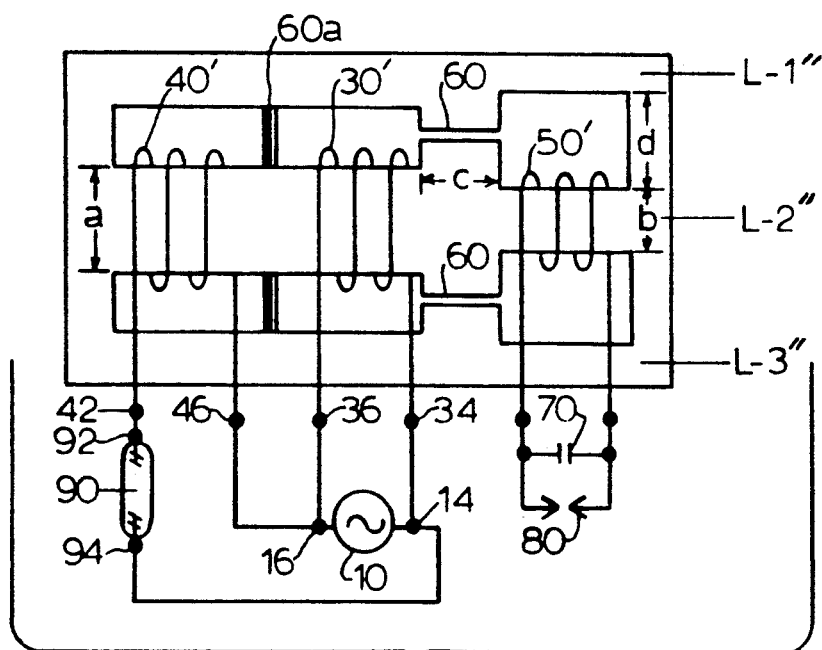
FIG. 5 is a diagrammatic view showing a third embodiment of a transformer-winding configuration for energizing both the electrocution grid and the mercury vapor lamp in a non-interacting manner, the transformer portion of which can be used with either the first form (FIG. 1) or second form (FIG. 4) of the invention device.

Two basic forms of the invention device are illustrated in FIGS. 1 and 4. First, second and third transformer-winding configurations are illustrated in FIGS. 2, 3 and 5.

Figure 2:
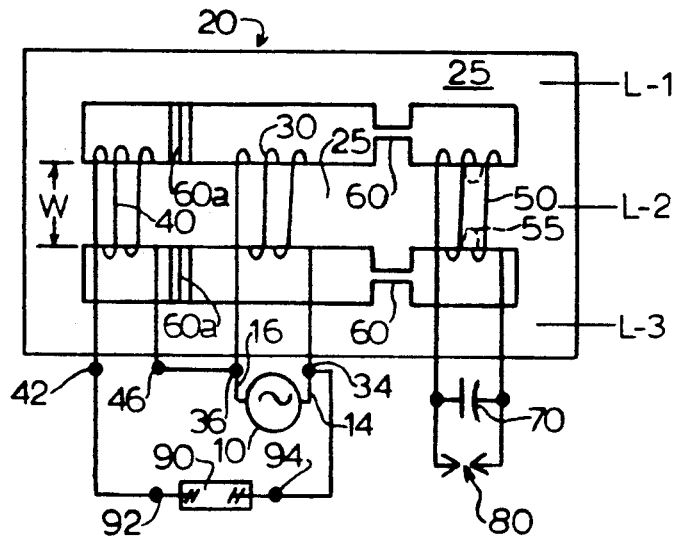
FIG. 2 is a diagrammatic view more specifically illustrating a first embodiment of a transformer-winding configuration for energizing both the electrocution grid and the mercury vapor lamp in a non-interacting manner, the transformer portion of which can be used with either the first form (FIG. 1) or second form (FIG. 4) of the invention device.

With further reference to FIGS. 1 and 2, transformer 20 comprises primary coil 30, ballast secondary coil 40 and high voltage secondary coil 50 all wound on a common leg of core 25. Transformer 20 is generally rectangular, has a core 25 made of stacked laminations as later described, provides a closed magnetic circuit and a plurality of legs L-1, L-2 and L-3. Primary coil 30 is preferably situated in the middle of common core leg L-2 while ballast secondary coil 40 and high voltage secondary coil 50 are located at opposite ends of common core leg L-2. Magnetic-flux shunt 60, illustrated as an air gap, is incorporated in the construction of transformer 20 and is situated between primary coil 30 and high voltage secondary coil 50.

FIGS. 1 and 2 as well as later referred to FIG. 3, illustrate an arrangement for series electrical connection of primary coil 30 and ballast secondary coil 40 for energizing a mercury vapor lamp 90. In this arrangement, first terminal 46 of ballast secondary coil 40 is connected to first terminal 36 of primary coil 30 and to first power source line 16. First terminal 92 of an outdoor type mercury vapor lamp 90 is connected to second terminal 42 of ballast secondary coil 40, while second terminal 94 of lamp 90 is connected to second terminal 34 of primary coil 30 and to second power source line 14. This series-coil arrangement is capable of providing the required starting and operating voltage (135V AC) for the preferred mercury vapor lamp 90 while requiring a relatively few windings in ballast secondary coil 40.

Power source 10 is typically a household 120 volts, 60 cycle, 185 watt power source. A suitable mercury vapor lamp is an outdoor type mercury vapor lamp rated at 135 volts, 151 watts and 1.25 amperes. The high voltage output for the secondary coil 50 on open circuit is typically about 7500 volts and on short circuit, when electrocution grid 80 shown connected in series with coil 50 is operating, coil 50 has a 35 mA output.

Capacitor 70, shown in FIGS. 1, 2 and 3, in parallel with coil 50, is a peaking capacitor having a capacitance value selected so that when connected in parallel with high voltage secondary coil 50, the coil/capacitor inductance arrangement resonates the third harmonic of the power frequency thereby providing the required inductance and producing a highly peaked output voltage and decreasing the number of turns required in high voltage secondary coil 50 to produce the needed high voltage. Magnetic slot 55, shown by broken lines in FIG. 3, may also be utilized to enhance the harmonic generation in high voltage secondary coil 50 in order to obtain high voltage output. The high output voltage from the coil/capacitor inductance arrangement of the invention in all embodiments energizes electrocution grid 80. While not shown, it is contemplated that by the use of additional windings in secondary coil 50, the need for capacitor 50 could be eliminated.

In a working prototype embodiment, transformer 20, as shown in FIG. 2, was made up from core laminate material made by the Tempel Company of Niles, Illinois. The width W of leg L-2 (FIG. 2) was 0.800 inches, and the stack height was 1.45 inches. The primary coil 30 and ballast secondary coil 40 each had 337 turns of 0.0253 inch copper wire. The high voltage secondary coil 50 had 10,900 turns of No. 42 copper wire and capacitor 70 was a 0.002 microfarad capacitor. The magnetic-flux shunt 60a was formed of a 0.65 inch thick laminate stack and the magnetic-flux shunt 60 was formed with a commercially available 0.020 air gap which while adequate to prove operability, was recognized as not being an optimum width from the viewpoint of minimizing the size of the capacitor required and minimizing losses in both the primary coil 30 and high voltage secondary coil 50. Thus, an optimum width for the magnetic-flux air gap shunt 60 is visualized as being within the scope of the invention. With an assumed 92% coupling, this arrangement gives a projected high voltage output of about 5050 volts and a boosted peak voltage of about 7500 volts. A conventional commercially available electrocution grid 80 was employed.

Magnetic shunt 60, shown in FIGS. 1, 2 and 3, is so constructed that whenever an electrocution occurs, magnetic shunt 60 diverts the entire primary magnetic flux without reflecting the resulting magnetic disturbance into ballast secondary coil 40. This shunting of magnetic energy by means of magnetic shunt 60 allows operation of electrocution grid 80 free of any visibly detectable change in the light output of the mercury vapor lamp 90. In the embodiment being described, the mentioned mercury lamp wattage dropped from 151 watts to 148 watts on each electrocution. This approximate 2% change was visibly undetectable illustrating that the desired magnetic isolation was achieved.

FIGS. 1, 2 and 3 also show a laminated core stack formed magnetic-flux shunt 60a which serves as means for loosely coupling the ballast secondary coil to the primary coil, thereby obtaining a ballast transformer characterized by having a high leakage reactance. While such a characteristic is recognized as having been achieved in other applications, it has been discovered to be particularly advantageous in the combination insect exterminator-lamp circuitry of the invention.

As will be understood from the prior description, either of the transformer-winding configurations shown in FIGS. 2 or 3 may be used in the circuitry of FIG. 1. The difference between the transformer-winding combination of FIG. 3 from that of FIG. 2 in which similar numerals identify similar elements will also be seen in the transformer core of FIG. 2 having three legs L-1, L-2 and L-3, as compared to the transformer core of FIG. 3 having only two legs, L-1' and L-2'. As will also become apparent, either of the transformers shown in FIGS. 2 and 3 may be used in the circuitry of FIG. 4.

In the second form of the invention device shown in FIG. 4, ballast secondary coil 40a is assumed to have a suitable greater number of windings than ballast secondary coil 40. In the FIG. 4 circuitry, first terminal 92 of mercury vapor lamp 90 is connected to first terminal 42 of ballast secondary coil 40a while second terminal 94 of mercury vapor lamp 90 is connected to second terminal 46 of ballast secondary coil 40a. No electrical connection is provided between terminals 34 or 36 of primary coil 30 to terminals 42 or 46 of ballast secondary coil 40a or to terminals 92 or 94 of mercury vapor lamp 90 because ballast secondary coil 40a comprises, as previously mentioned, a larger number of windings than the number of windings comprising ballast secondary coil 40 utilized in the configurations shown in FIGS. 1, 2, and 3, and therefore produces a higher voltage than ballast secondary coil 40. This larger number of windings thus compensates for the primary coil windings not being in series with the ballast secondary coil windings as in FIGS. 1, 2 and 3.

While not shown, it is also to be understood that either of the three-leg or two-leg type transformers shown in FIGS. 2 and 3 could be employed with the winding connections illustrated in FIG. 4. Further, any manner of mounting the primary and secondary coils on the transformer legs other than that shown, could be employed so long as the described high reactance and magnetic isolation characteristics are achieved.

A third transformer-winding embodiment is illustrated in FIG. 5 in which the width "b" of the laminate under the high voltage coil 50 is substantially less than the laminate width "a" under the primary coil 30 thereby permitting more turns in the high voltage coil 50 while retaining the desired open circuit voltage. Other elements of the circuit which repeat themselves in FIG. 5 are noted by the same numerals. The greater coil space "d" accommodates these turns and permits a shunt width "c" compatible with a large shunt area without requiring an excessive overall length. Further, the need for a very small shunt air gap is avoided. While not shown, it is to be understood that the transformer 20' of FIG. 5 could be used with either the FIG. 1 or FIG. 4 circuitry.

While the present invention has been described with reference to particular embodiments thereof, it will be understood that numerous modifications may be made by those skilled in the art without departing from the scope of the invention. Therefore, the appended claims are intended to cover all such equivalent variations as come within the true spirit and scope of the invention.

What is claimed is:

1. A device capable of simultaneously electrocuting insects and illuminating an area surrounding the location of the device, comprising:
   (a) a housing;
   (b) an insect electrocution grid mounted on said housing;
   (c) an electrically energized lamp mounted on said housing and suited for both illuminating an area surrounding the device and providing a light source suited to luring insects to said insect electrocution grid; and
   (d) an electrical circuit mounted on said housing and adapted to be connected to a source of alternating current to concurrently operate said insect electrocution grid and said lamp, said electrical circuit comprising a single transformer formed by a core having a plurality of legs and flux paths, having a primary coil arranged for being connected to a source of alternating current, a ballast secondary coil connected for operating said lamp and a high voltage secondary coil connected for operating said insect electrocution grid, and means for diverting the flux among said plurality of flux paths upon each instance of insect electrocution by said insect electrocution grid whereby to maintain the level of illumination produced by said lamp substantially constant and continuous.

2. The device according to claim 1 wherein said primary coil is situated in the center of a first leg of said core, said ballast secondary coil is situated at a first end of said first leg of said core and said high voltage secondary coil is situated at a second end of said first leg of said core opposite said first end.

3. The device according to claim 2 wherein the cross section area of said first leg of said core is less under said high voltage secondary coil than under said primary and ballast secondary coils.

4. The device according to claim 2 wherein said means for diverting the flux among said plurality of flux paths comprises a magnetic-flux shunt situated between said primary coil and said high voltage secondary coil and capable of diverting the entire primary magnetic flux upon each instance of insect electrocution by said insect electrocution grid.

5. The device according to claim 4 further comprising a laminated core stack magnetic-flux shunt situated between said primary coil and said ballast secondary coil.

6. The device according to claim 5 further comprising a capacitor connected in parallel with said high voltage secondary coil and having a capacity selected to induce the alternating current of the source to resonate at the third harmonic of the frequency of said alternating current thereby to amplify the high voltage output of said high voltage secondary coil.

7. The device according to claim 6 wherein said lamp comprises a mercury vapor lamp.

8. The device according to claim 7 wherein said mercury vapor lamp is connected in series with said primary and said ballast secondary coils.

9. The device according to claim 8 wherein said transformer core includes a magnetic slot situated under said high voltage secondary coil and operative to further amplify said high voltage output.

10. The device according to claim 7 wherein said mercury vapor lamp is connected in parallel with said ballast secondary coil.

11. The device according to claim 10 wherein said transformer includes a magnetic slot situated under said high voltage secondary coil and operative to further amplify said high voltage output.

12. The device according to claim 1 further comprising a capacitor connected in parallel with said high voltage secondary coil and having a capacity selected to induce the alternating current of the source to resonate at the third harmonic of the frequency of said alternating current thereby to amplify the high voltage output of said high voltage secondary coil.

13. The device according to claim 1 wherein said lamp comprises a mercury vapor lamp.

14. A device capable of simultaneously electrocuting insects and illuminating an area surrounding the location of the device, comprising:
   (a) a housing;
   (b) an insect electrocution grid mounted on said housing;
   (c) a mercury vapor lamp capable of both illuminating an area surrounding the device and providing a light source suited to luring insects to the grid and mounted on said housing; and
   (d) an electrical circuit mounted on said housing and adapted when connected to a source of alternating current to concurrently operate said electrocution grid and said mercury vapor lamp, comprising:
      (i) a single transformer formed by a laminated core having a plurality of legs and flux paths, a primary coil wound in the middle of a selected leg of said core, a ballast secondary coil wound on a first end of said selected leg of said core, a high voltage secondary coil wound on a second end of said selected leg of said core opposite said first end, a magnetic-flux shunt capable of diverting the entire primary flux situated between said primary coil and said high voltage secondary coil, and a laminate formed magnetic-flux shunt situated between said primary coil and said ballast secondary coil;

(ii) a peaking capacitor connected in parallel with said high voltage secondary coil and having a capacity selected to induce the alternating current of the source to resonate at the third harmonic of the frequency of said alternating current source; and (iii) said mercury vapor lamp being connected in series with said primary and ballast secondary coils.

15. A device according to claim 14 including a magnetic slot situated under said high voltage secondary coil and operative to further amplify said high voltage output.

* * * * *